(12) United States Patent
Suzuki et al.

(10) Patent No.: US 10,927,900 B2
(45) Date of Patent: Feb. 23, 2021

(54) WET-TYPE MULTIPLE PLATE CLUTCH

(71) Applicant: UNIPRES CORPORATION, Yokohama (JP)

(72) Inventors: Ryosuke Suzuki, Fuji (JP); Hideyuki Nezu, Fuji (JP); Takashi Matsuura, Fuji (JP)

(73) Assignee: UNIPRES CORPORATION, Yokohama (JP)

( * ) Notice: Subject to any disclaimer, the term of this patent is extended or adjusted under 35 U.S.C. 154(b) by 219 days.

(21) Appl. No.: 16/053,671

(22) Filed: Aug. 2, 2018

(65) Prior Publication Data

US 2018/0340577 A1 Nov. 29, 2018

Related U.S. Application Data

(63) Continuation of application No. PCT/JP2017/007301, filed on Feb. 27, 2017.

(30) Foreign Application Priority Data

Mar. 16, 2016 (JP) .............................. JP2016-052388

(51) Int. Cl.
*F16D 13/64* (2006.01)
*B60K 6/387* (2007.10)
(Continued)

(52) U.S. Cl.
CPC .............. *F16D 13/64* (2013.01); *B60K 6/387* (2013.01); *B60K 6/40* (2013.01); *F16D 13/72* (2013.01);
(Continued)

(58) Field of Classification Search
CPC .......... F16D 13/62; F16D 13/64; F16D 13/72; F16D 13/74; F16D 69/00;
(Continued)

(56) References Cited

U.S. PATENT DOCUMENTS 5,094,331 A 3/1992 Fujimoto et al.
5,452,784 A 9/1995 Miyoshi et al.
(Continued)

FOREIGN PATENT DOCUMENTS

JP H01-140028 U 9/1989
JP H08-135679 A 5/1996
(Continued)

OTHER PUBLICATIONS

Segami Hideaki. Espacenet machine translation of JP2010255721 Power Transmission Device. Nov. 11, 2010. (Year: 2010).*
(Continued)

*Primary Examiner* — Charles A Fox
*Assistant Examiner* — Lori Wu
(74) *Attorney, Agent, or Firm* — Foley & Lardner LLP

(57) ABSTRACT

A wet-type multi plate clutch is configured to be used for a transmission in an automobile. A clutch pack is provided with a plurality of drive plates and a plurality of driven plates. The drive plates have single surfaces on which first clutch facings are fixed and opposed surfaces on which annular grooves are formed along entire peripheral lengths. The driven plates have single surfaces on which second clutch facings are fixed and opposed surfaces on which annular grooves are formed along entire peripheral lengths. The sliding surfaces of the drive plates and the driven plates are arranged between the first and second clutch facings, which are axially adjacent with each other.

6 Claims, 13 Drawing Sheets

(51) Int. Cl.
B60K 6/40 (2007.10)
F16D 13/72 (2006.01)
F16D 13/74 (2006.01)
F16D 69/00 (2006.01)
F16D 13/62 (2006.01)
F16D 25/0638 (2006.01)
F16D 65/02 (2006.01)
F16D 65/12 (2006.01)
B60K 6/48 (2007.10)

(52) U.S. Cl.
CPC ............ F16D 13/74 (2013.01); F16D 69/00 (2013.01); B60K 2006/4825 (2013.01); B60Y 2200/92 (2013.01); B60Y 2400/4244 (2013.01); F16D 13/62 (2013.01); F16D 25/0638 (2013.01); F16D 65/127 (2013.01); F16D 2065/1332 (2013.01); F16D 2069/004 (2013.01); F16D 2300/10 (2013.01)

(58) Field of Classification Search
CPC ........... F16D 2069/004; F16D 25/0638; F16D 2065/1332; F16D 65/127; F16D 2300/10; B60K 6/387; B60K 6/40; B60K 2006/4825; B60Y 2400/4244; B60Y 2200/92
See application file for complete search history.

(56) References Cited

U.S. PATENT DOCUMENTS

| | | | |
|---|---|---|---|
| 5,879,260 | A | 3/1999 | Yoshida et al. |
| 6,484,853 | B1 | 11/2002 | Zagrodzki |
| 7,059,459 | B2 | 6/2006 | Miyoshi |
| 7,779,980 | B2 | 8/2010 | Toya |
| 9,175,632 | B2 | 11/2015 | Hirotsu et al. |
| 9,624,986 | B2 | 4/2017 | Nakano et al. |

FOREIGN PATENT DOCUMENTS

| | | |
|---|---|---|
| JP | H08-326776 A | 12/1996 |
| JP | 2005-308183 A | 11/2005 |
| JP | 2007-278354 | 10/2007 |
| JP | 2009-030663 A | 2/2009 |
| JP | 2010-255721 A | 11/2010 |
| JP | 2015-021522 A | 2/2015 |
| WO | WO-2015/037588 | 3/2015 |

OTHER PUBLICATIONS

Amano Norihira. Espacenet machine translation of WO2015037588 Failure Determination Device for Hybrid Vehicles. Mar. 19, 2015. (Year: 2015).*

* cited by examiner

Embodiment

WET-TYPE MULTIPLE PLATE CLUTCH

CROSS-REFERENCE TO RELATED APPLICATIONS

This application is a continuation of International Application No. PCT/JP2017/007301, filed Feb. 27, 2017, and claims priority to Japanese Patent Application No. 2016-052388 filed Mar. 16, 2016, the entire contents of which are incorporated herein by reference.

TECHNICAL FIELD

The present invention relates to a wet-type multiple plate clutch, that is, in particular, capable of used, for example, for a transmission of an automobile.

BACKGROUND

A wet-type multi-plate clutch used for a transmission for an automobile is known, wherein it has dive side clutch plates (drive plates) rotating integrally with a drive side tubular member (a clutch hub et al) and axially slidably movable with respect to the drive side tubular member and has driven side clutch plates (driven plates) rotating integrally with a driven side tubular member (a clutch drum et al) and axially slidably movable with respect to the driven side tubular member, wherein the drive side clutch plates and the driven side clutch plates are arranged along an axial direction in an alternate manner, wherein clutch facings are arranged between the drive side clutch plates and the driven side clutch plates, which are adjacent with each other and wherein a clutch oil supply is always occurred between the clutch plates. An arrangement can be taken, wherein the clutch facings are attached to both sides of each of the drive sided clutch plates, i.e., no provision of any clutch facing is made on the driven side clutch plates, which arrangement is referred herein below as "double side attached arrangement". See Patent Document 1 et al. As an alternative, an arrangement can also be taken, wherein a clutch facing is attached to a side of each of the drive side clutch plates as well as a side of each of the driven side clutch plates. This latter arrangement is referred herein below as "single side attached arrangement". See Patent Document 2 et al.

The double side attached arrangement is advantageous in a small value of an axially deflected movement of the clutch plates in a non-connected or released condition of the clutch, which is advantageous in a reduced friction force under a non-connected condition of the clutch. However, the double side attached arrangement is, due to a sandwiched structure of the driven side clutch plates by the clutch facings, disadvantageous in a highly increased temperature of the driven side clutch plates in case where a torque transmission is occurred while the clutch plates being subjected to a relative slide movement, due to the fact that a transmission of a heat as generated by a relative slide movement toward central parts of the clutch plates is occurred not only in a radial direction but also in an axial direction, resulting in a locally concentrated heat at the central parts of the clutch plates. In order to combat this temperature increase problem in the double side attached arrangement, an improved structure has been proposed wherein a ring shaped groove is formed along the entire periphery of a face of the driven side clutch plate opposite the clutch facing in order to obtain an effect for controlling of temperature increase at the central part of the clutch plate thanks to the clutch oil deposited to the groove. See Patent Document No. 3.

In the single side attached arrangement clutch, its advantage and disadvantage are reversed with respect to the double side attached arrangement clutch. Namely, a problem in an increased friction as a result of an occurrence of an axially deflected movement of the clutch plates is likely generated during the non-engaged condition of the clutch in the single side attached arrangement clutch. However, a problem of the locally increased temperature of the clutch plates is less likely even comparison with the improved construction of the double side attached arrangement provided with the annular grooves as proposed in the Patent Document 3, due to the fact that the arrangement of the clutch facings on both of drive and driven plates can obtain a heat insulating effect with respect to the heat as generated by the relative slide movement especially in the axial direction, resulting in a reduced degree of local concentration of the friction heat to the clutch, i.e., evened distribution of the heat as generated by the slide movement.

In relation to the explanation of the embodiments of the present invention as will described herein below, Patent Document 4 should be referred with regard to a continuous variable transmission device having a wet-type multiple plate clutch. Furthermore, Patent Documents 5 and 6 should be referred with regard to a hybrid type vehicle provided with wet-type multi plate clutch and continuous variable transmission device with no provision of any toque converter at the outlet shaft of the engine.

PRIOR ART DOCUMENT

Patent Document

Patent Document 1: JPP 2013-249871
Patent Document 2: JPP H08-135679
Patent Document 3: JPP 2005-308183
Patent Document 4: JPP H09-310745
Patent Document 5: JPP 2015-21522
Patent Document 6: JPP 2013-151175

SUMMARY OF THE INVENTION

Problems to be Solved

As will be clear from the above discussion as to the advantage and disadvantage, there exists a clear incompatibility between the double side attached arrangement and the single side attached arrangement in the wet-type multi-plate clutch. Namely, from the point of view of reduced friction in a high rotating seed area, the double side attached arrangement is advantageous because a deflected movement of the clutch plates is less likely. Contrary to this, from the point of view of the requirement of reduced influence of the friction heat, the single side attached arrangement is advantageous because the clutch facings arranged between the clutch plates is effective for increasing a heat insulating ability in the axial direction. It can, therefore, at least, be stated that the single side attached arrangement has an increased adaptability to an area of use where a wet-type multi plate clutch of capable of solving the problem of friction heat is required. Even in the single side attached arrangement, so long as a control of the heat conduction in a radial direction is concerned, any control the heat transmission is not done in the radial direction. A resultant temperature gradient by a concentration of the heat to the central parts of the clutch plates may cause the clutch plates to be subjected to deformations, which makes the single side attached structure in the prior art structures to be improper for the use in a field where a resolution of the problem of the friction heat is required. In a hybrid type vehicle, where an internal combustion engine as well as an electric motor are used for power sources and where a CVT as a transmission device is used while no provision being made as to any torque converter at the output shaft of the engine (Patent Document 5 or the Patent Document 6), a slip or slide control of the clutch at the start up is done for a reduction of a rotating speed difference during the start-up operation mode. In this type of automobile, a large amount of a transmission torque of the clutch is required while the latter being slipped in an operating mode such as a hill start, resulting in a huge amount of friction heat at the clutch, which, sometimes, may even the single side attached arrangement of a better heat characteristic among the prior art not to be enough and an improvement in this regard has, therefore, been required.

The present invention is motivated by the above-mentioned problems in the conventional structures the wet-type multi plate clutches and aims to obtain an improvement of a heat characteristic as well as an optimization of a friction in a non-engaged condition of the clutch.

Means for Solving the Problems

According to the present invention, a wet-type multi plate clutch is provided, which comprises: a drive side tubular member; a plurality of drive side clutch plates fixed in rotation and axially slidable with respect to the drive side tubular member; a driven side tubular member; driven side clutch plates fixed in rotation with respect to the driven side tubular member and axially slidable with respect to the driven side tubular member in an axially alternate manner with respect to the drive side clutch plates, and; clutch facings arranged on one of axially opposite surfaces between the drive side clutch plates and the driven side clutch plates, which are axially adjacent with each other, wherein an axially relative movement of the drive side clutch plates and the driven side clutch plates under an outwardly applied force causes said opposite surfaces of the drive side clutch plates and the driven side clutch plates to obtain a clutch engaged condition due to relative engagements between said opposite surfaces of the drive side clutch plates and the driven side clutch plates by way of the clutch facing while slippages being generated or no slippage being generated and wherein the wet-type multi plate clutch further comprises annular grooves on the surfaces of the clutch plates along substantially entire circumferential length at parts thereof engaging with the clutch facings in a manner that the clutch engagement causes said parts of the clutch plates to be interposed by the insulating materials.

Thanks to the interposed arrangement of the parts of the clutch plates engaging with the clutch facings by the clutch facings made from the insulating material during the engagement of the clutch while being slipped, the clutch facings function as axially discontinuous parts in the heat conduction, which, in cooperation with the clutch oil held in the grooves, functions to suppress heat increase at the annular grooves whereat a sliding contact with the clutch facing occurs, on one hand and, on the other hand, a centrally directed concentration of the sliding heat in the sliding parts of the clutch is prevented due to the fact that an outwardly directed dissipation of the friction heat is allowed. As a result, temperature gradients of the clutch plates are moderated, on one hand and, on the other hand, a unification of temperature of the clutch plates is, as a whole, realized.

The idea of the present invention can be realized not only in the single attached arrangement but also in the double side arrangement. In case of the single attached arrangement, the sliding surface are located between the clutch facings on the drive side clutch plates and the clutch facings on the driven side clutch plates. In clutch engagement, the sliding surfaces are sandwiched between the heat insulating material layers constructing the clutch facings, so that a suppression of the axial heat conduction generated in the sliding surfaces of the clutch plates is obtained. Furthermore, the annular grooves are arranged on sliding surfaces and the portions of the annular grooves filled by the oil function to prevent radial heat conduction, thereby preventing the friction heat on the sliding surfaces from being concentrated to the central parts of the clutch plates. In other words, a uniform transmission of the friction heat to the entire parts of the clutch plates is obtained on the sliding surfaces, resulting in a reduction of temperature gradients as well as a unification of temperature values in the clutch plates. In addition, in the clutch of the single side attachment arrangement in the prior art, an oil amount difference between the clutch facings and the sliding surfaces in the driven side clutch plates may occur during non-engaged condition of the clutch while the rotating speed is low, which results in an axial deflected movement of the driven side clutch plates, resulting in a problem of an increased friction. According to the present invention, the annular groove on the surface of the clutch plate effecting the slide movement can hold additional amount of the lubricant oil, which functions to balance the oil film thickness between the faced surfaces, causing the dynamic force difference to be reduced, resulting in a reduction in the axial deflected movement of the clutch plates. As a result, a reduction in a friction during the clutch engaged condition is realized.

In a conventional structure of the wet-type multi-plate clutch of the double attached arrangement, the drive side clutch plate is provided with clutch facings on both sides thereof. Contrary to this, the driven side clutch plate is provided with no clutch facing and is formed with annular grooves on both of the sliding surfaces thereof. In an improved structure according to the present invention, the driven side clutch plate has an intermediate layer for heat insulation purpose. As a result, when a clutch engagement is obtained while being slipped, each of the sliding surfaces on both sides of the driven side clutch plate is sandwiched between faced clutch facing of the drive side clutch plate and the intermediate heat-insulating layer. As a result, a reduction of the axial heat conduction is obtained. Furthermore, the annular grooves are arranged on the sliding surfaces, which prevents radial heat conduction from being occurred. As a result of this improved construction, a locally increased temperature at the central part is prevented, on one hand and, on the other hand, an evened temperature distribution is obtained. Namely, a reduction effect of the temperature gradient of the same level as that of the single side attached arrangement is obtained.

DETAILED DESCRIPTION

Figure 1:
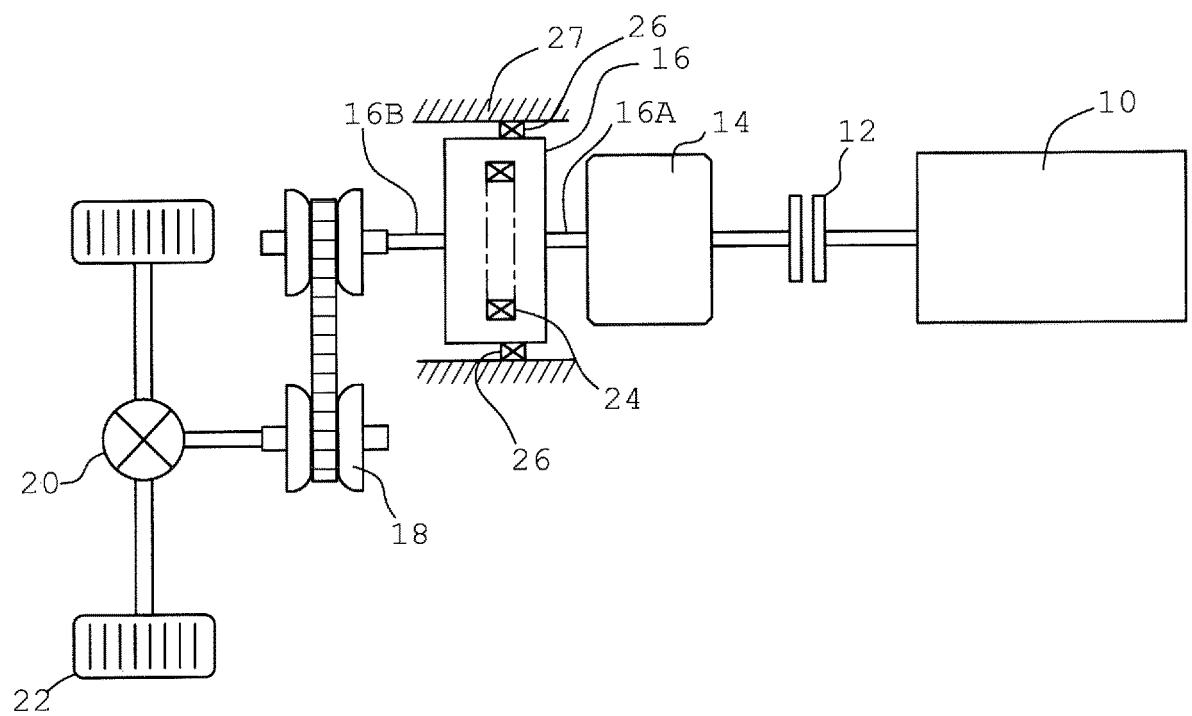
FIG. 1 is a schematic view of 1-motor, 2-clutch hybrid vehicle having a forward-reverse switching mechanism provided with a wet-type multi plate clutch according to the present invention.

A wet-type multi plate clutch in a first embodiment of the present invention will now be illustrated with reference to a case where a wet-type multi-plate clutch in a first embodiment of the present invention is applied to a so-called 1-motor, 2-clutch hybrid vehicle. FIG. 1 illustrates schematically a drive train of the 1-motor, 2-clutch hybrid vehicle. In FIG. 1, a reference numeral 10 denotes an internal combustion engine as a power source of the vehicle, 12 a clutch for a selective transmission of the driving power of the engine 10, referred hereinbelow as an engine clutch, 14 an electric motor as a driving source for the vehicle functioning also as a charging generator, 16 a forward-reverse switching mechanism of a planetary gear type, 18 a belt-type continuous transmission (CVT), 20 a differential and 22 drive wheels. The forward-reverse switching mechanism 16 is provided with an input shaft 16A and an output shaft 16B, which are schematically illustrated. The input shaft 16A receives a driving force from the driving power sources, i.e., the engine 10 and/or the electric motor 14. The driving power as received is transmitted to the CVT 18 from an output shaft 16B. As will be discussed in detail later, the forward-reverse switching mechanism 16 is provided with a forward clutch 24 as a wet-type multi-plate clutch. As will be discussed later, the clutch 26 transmits, at one to one rotating speed relationship, a rotating movement from the engine and/or the electric motor to the wheels under an integrated rotating movement of the three rotating elements of the planetary gear device as will be discussed later. The forward-reverse switching mechanism 16 is further provided with a reverse clutch 26 as a wet-type multi-plate clutch, which, as will be discussed later, transmits the rotating movement of the engine and/or the electric motor at a predetermined gear ratio by braking or fixing one of rotating elements of the planetary gear device to the transmission case 27. The 1-motor, 2-clutch hybrid vehicle has no torque converter at an outlet shaft of the engine motor and a rotational speed difference upon a start of the vehicle is absorbed by a control of a degree of slippage of the clutch 24 or 26.

In an operation of the 1-motor, 2-clutch hybrid vehicle, the engine clutch 12 is disengaged during a low rotational speed or a low load condition of the engine, so that so-called EV mode is employed where the vehicle is moved by using a power of the electric motor. When the rotating speed and/or the engine load exceeds a threshold value, a hybrid or HEV mode is obtained, in which HEV mode, in addition to the electric motor 14, the engine 10 is used as a power source. When the vehicle is started, the HEV mode is used while a wet start clutch (WSC) operation is employed. In this WSC operation, the forward clutch 24 or the reverse clutch 26 is slipped and the amount of the slippage of the clutch is controlled so as to obtain a transmitted torque, which corresponds to a desired load detected by a degree of a depression of an accelerator pedal (not shown), which is operated by a pressured oil from its source. So long as a clutch control in WSC operation is concerned, refer to the Patent Document 5 and Patent Document 6, if necessary.

Figure 2:
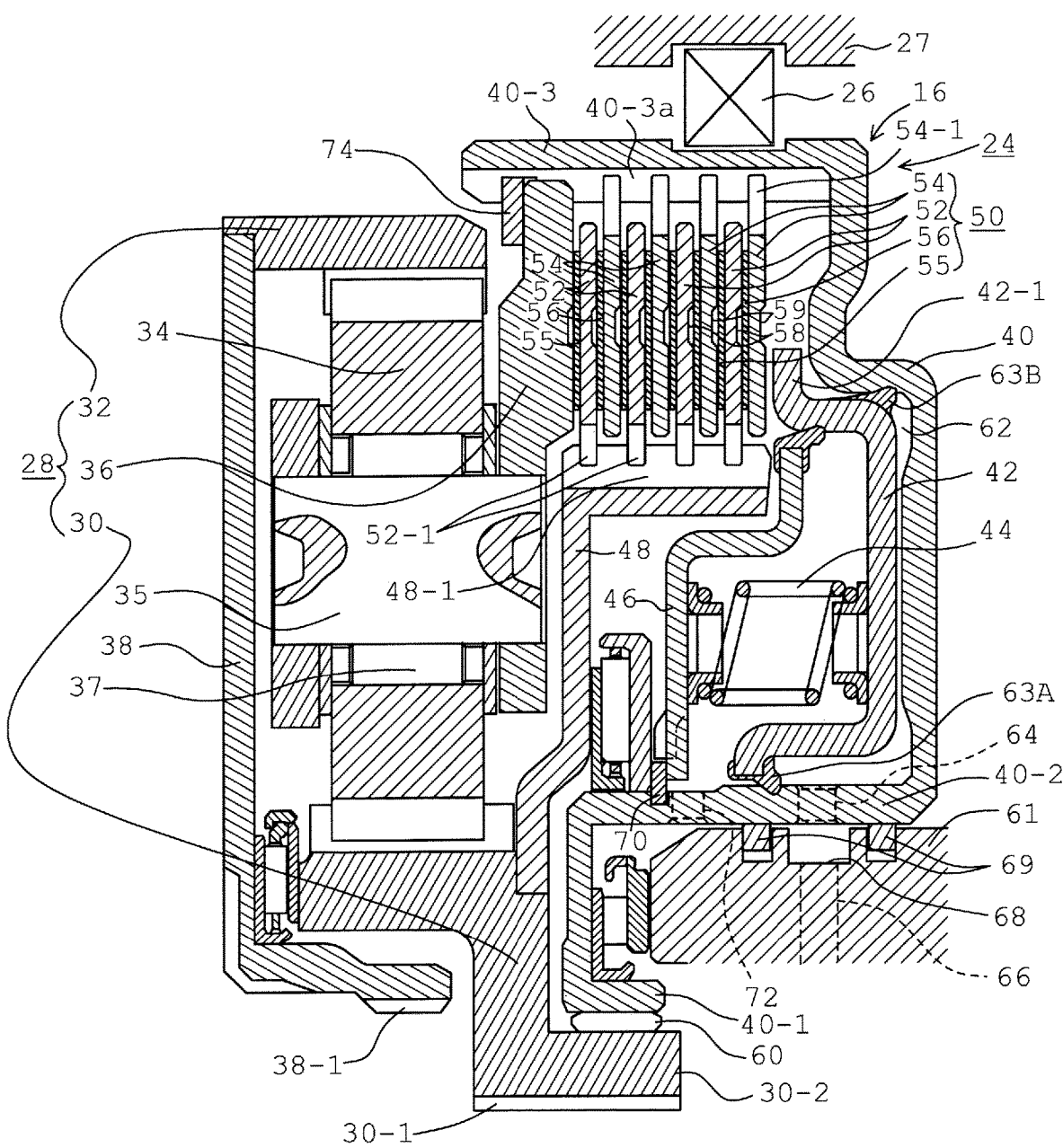
FIG. 2 is a cross-sectional view of the forward-reverse switching mechanism in the hybrid vehicle shown in FIG. 1, which shows, in detail, a forward clutch in a first embodiment of the wet-type multi plate clutch according to the present invention.

FIG. 2 illustrates a construction of the forward-reverse switching mechanism 16 in this embodiment, which mechanism is provided with the forward clutch 24 and the reverse clutch 26. These clutches 24 and 26 are, respectively, wet-type multi plate clutches. The forward clutch 24 is illustrated in detail and the reverse clutch 26 is schematically illustrated for the sake of simplicity. The forward-reverse switching mechanism 16 includes, in addition to the above-mentioned forward clutch 24 and the reverse clutch 26, a planetary gear mechanism 28. The planetary gear mechanism 28 is of a well-known construction including three rotating elements that are a sun gear 30, a ring gear 32 and a carrier 36, to which carrier a circumferentially equally spaced plurality of planetary gears 34 are supported rotatably to the carrier 36 by planetary gear shafts 35 and respective needle bearings 37. The sun gear 30 has, at its inner peripheral surface, splines 30-1, with which a not shown rotating shaft corresponding to the input shaft 16A on the power source side in FIG. 1 engages, so that the sun gear 30 can receive a rotating movement from the engine 10 and/or the electric motor 14. An end plate 38 is fixed to the end of the ring gear 32 has an inner tubular part having, at its inner surface, splines 38-1, with which a not shown rotating shaft corresponding the output shaft 16B to the CVT (18) in FIG. 1 engages, so that a forward or reverse rotating movement is transmitted to the CVT 18.

Figure 3:
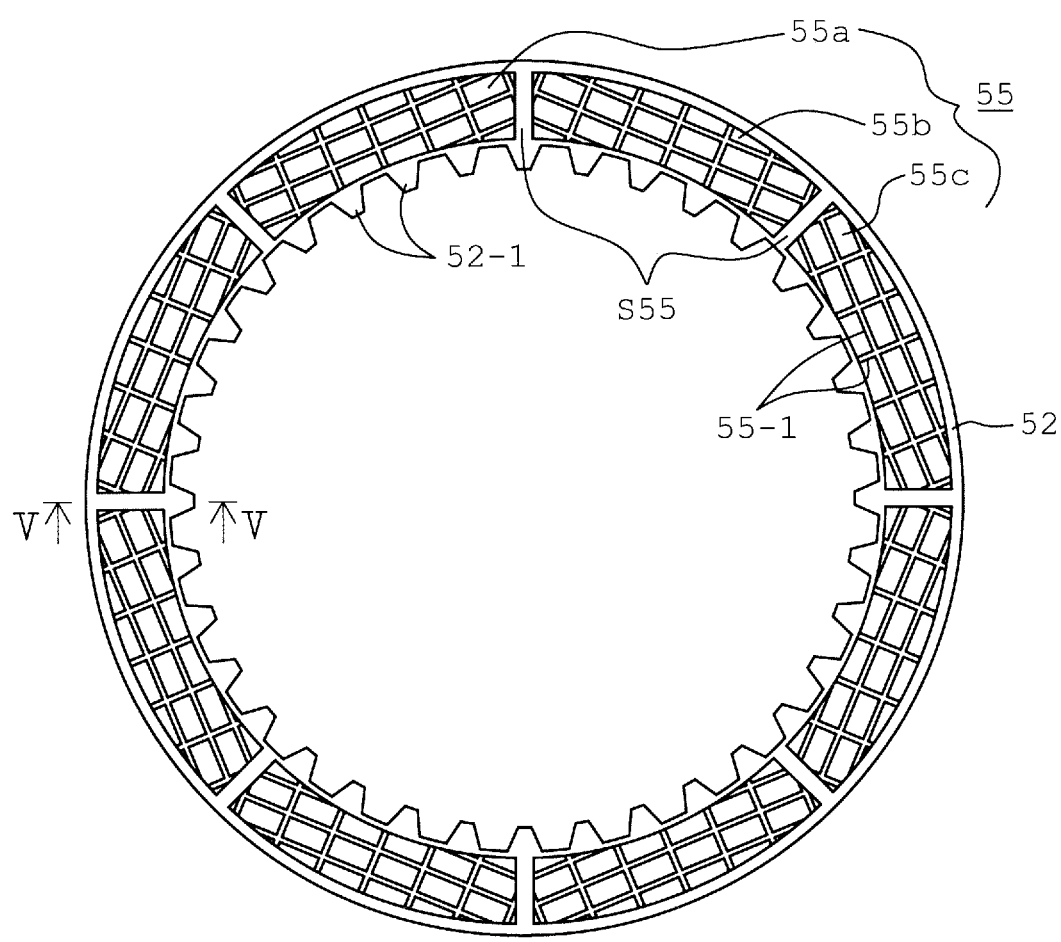
FIG. 3 is a front elevational view of a drive plate in the wet-type multi plate clutch as shown in FIG. 2, taken along a direction III of FIG. 5.
Figure 4:
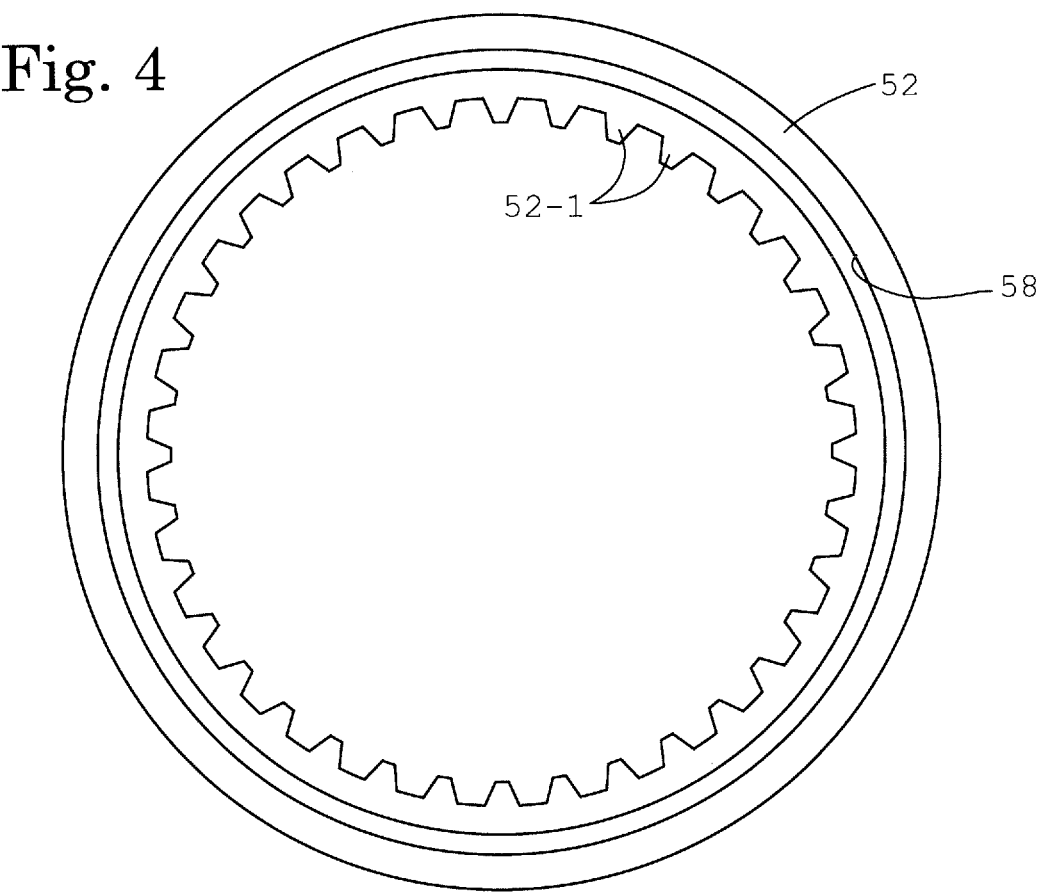
FIG. 4 is a rear elevational view of the drive plate, taken along a direction IV in FIG. 5.
Figure 6:
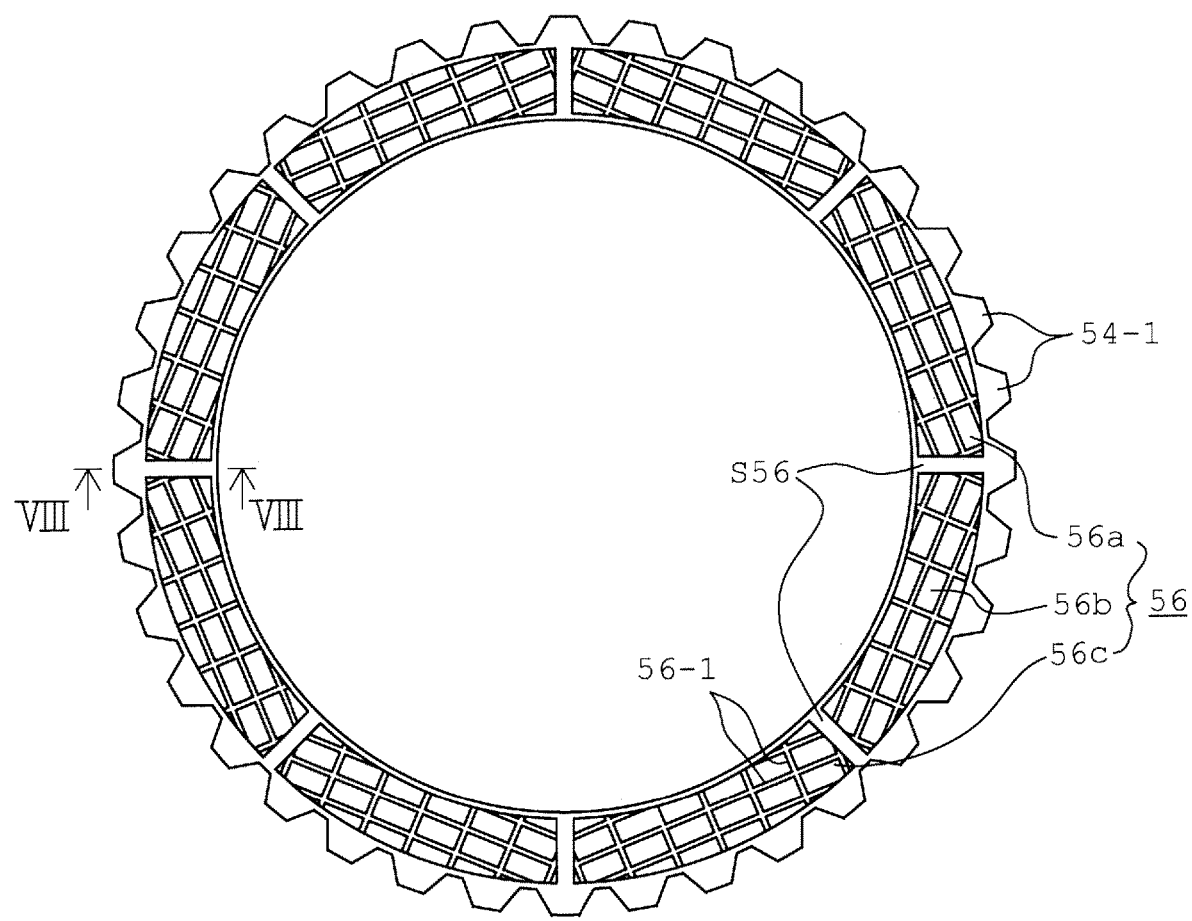
FIG. 6 is a front elevational view of a driven plate in the wet-type multi plate clutch as shown in FIG. 2, taken along a direction VI in FIG. 8.
Figure 7:
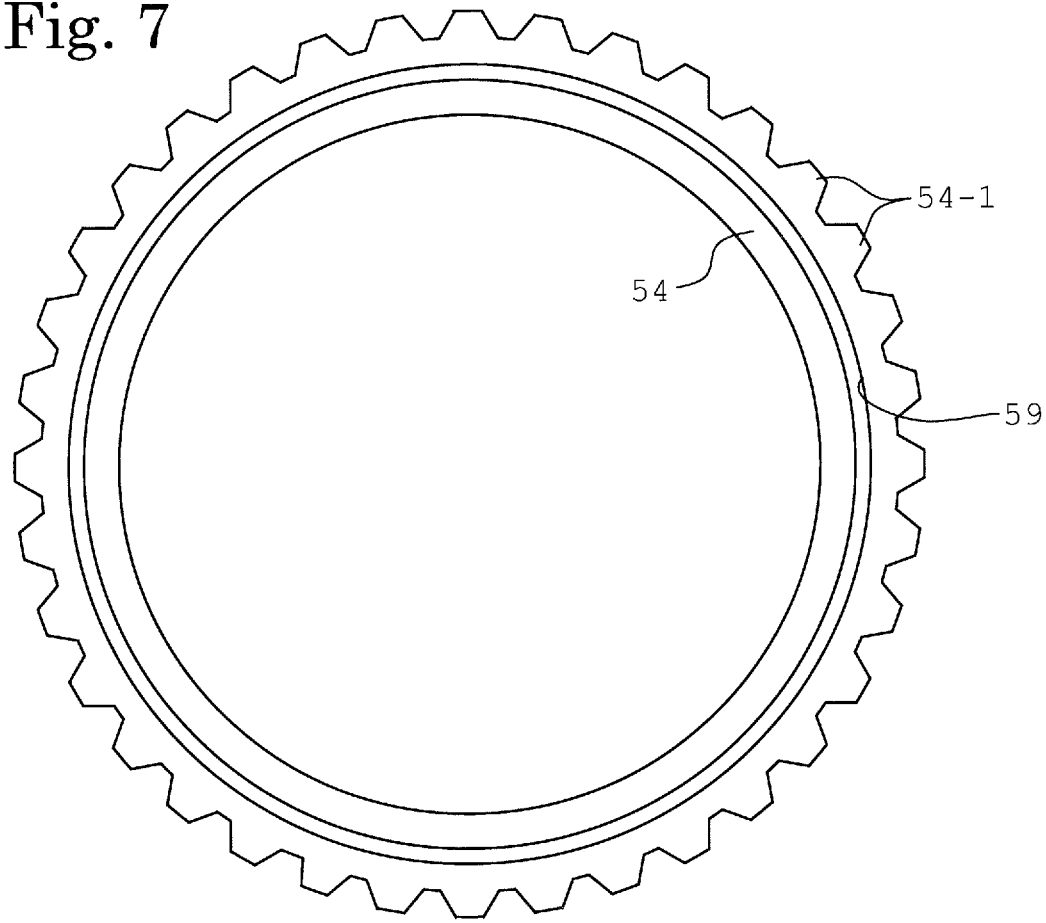
FIG. 7 is a rear elevational view of the driven plate, taken along a direction VII in FIG. 8.

A construction of the forward clutch 24 in the forward-reverse switching mechanism 16 will now be explained. The forward clutch 24 includes a clutch drum 40 (driven side tubular member of the claimed invention), a hydraulic pressure piston 42, coil springs 44, a spring plate 46, a clutch hub 48 (drive side tubular member of the claimed invention) and a clutch pack 50. As described later, the clutch pack 50 includes drive plates 52 (drive side clutch plate in the claimed invention), driven plates 54 (driven side clutch plates in the claimed invention), clutch facings 55 formed from friction materials, such as glass fibers and resin materials et al, and secured only to single sides of the drive plates 52, and clutch facings 56 formed also from friction materials and secured only to single sides of the driven plates 54. The drive plates 52 and the driven plates 54 are arranged alternately, so that the clutch facings 55 on the single sides of the drive plates 52 and the clutch facings 56 on the single sides of the driven plates 54 are arranged in an axially alternate manner between the drive plates 52 and driven plates 54 axially adjacent with each other. So long as a relative positional relationship between the drive plates 52, the driven plates 54, and clutch facings 55 and 56 is concerned, see also to FIG. 9. Furthermore, the carrier 36 of the planetary gear device 28 receives a clutch engagement force from the most axially adjacent drive plate 52 by way of the clutch facing 55 attached to the single side thereof and functions as a constituent of the forward clutch 24, as will be understood from the construction as shown in FIG. 2. In other words, the carrier 36 takes a part as a driven plate in the clutch pack 50 of the invention. As shown in FIGS. 3 and 6, the clutch facings 55 and 56 are constructed from series connections of divided small sections 55a, 55b and 55c and 56a, 56b and 56c, respectively. Gaps S55 and S56 between the divided small sections form radial passageways for the clutch oil. Furthermore, the divided small sections form, at respective surfaces, a plurality of recesses 55-1 and 56-1, which are effective to obtain an equalized supply of the clutch fluid to the clutch plates, i.e., to parts of the drive plates 52 and the driven plates 54 that effect sliding movement. In addition, the drive plate 52 forms a ring shaped groove 58 on a side surface thereof opposite the side surface on which the clutch facing 55 is attached. Namely, the ring shaped groove 58 is formed on the side surface of the drive plate 52 of no provision of the clutch facing 55. In similar way, the driven plate 54 forms a ring shaped groove 59 on a side surface thereof opposite the side surface on which the clutch facing 56 is attached. Namely, the ring shaped groove 59 is formed on the side surface of the driven plate 54 of no provision of the clutch facing 56. Furthermore, as shown in FIG. 2, between the drive plates 52 and the driven plates 54 axially adjacent with each other, the ring shaped grooves 58 of the drive plates 52 are opposite the driven plates 54, on one hand and, on the other hand, the ring shaped grooves 59 of the driven plate 54 are opposite the drive plate 52. The ring shaped grooves 58 and 59 extend along the entire peripheries of the drive plate 52 and the driven plate 54, respectively while being coaxial with the axis of the rotation as shown in FIGS. 4 and 7. The coaxial arrangement of the ring shaped grooves 58 and 59 serves to obtain a minimized degree of a friction as generated by a slide movement between the edges of the ring shaped grooves 58 and 59 and the clutch facings under the WSC operation of the HEV vehicle where the clutch are engaged while being slipped. Note. Machining is preferably employed for obtaining the ring shaped grooves 58 and 59 in this embodiment. As an alternative, a press working may be employable for obtaining ring shaped grooves in a third embodiment of the present invention in FIG. 14, as will be discussed later.

A detail of the parts for the construction of the forward-reverse switching mechanism 16 as well as connections between constituent parts and arrangement thereof will now be explained in more detail. In FIG. 2, the clutch drum 40 is formed with tubular parts 40-1, 40-2 and 40-3 at an inner, an intermediate and an outer parts, respectively of the clutch drum 40. The clutch drum 40 is, at the inner tubular part 40-1 thereof, connected rotatably to a hub 30-2 of the sun gear 30 by means of a needle bearing 60. The clutch drum 40 is, at the intermediate tubular part 40-2, connected to rotatably to a drum support part 61, which forms as a stub shaft extending integrally from a transmission case 27 as a stationary part. The hydraulic piston 42 is axially slidably arranged to the clutch drum 40, so that a hydraulic pressure chamber 62 is formed between the piston 42 and the clutch drum 40. The hydraulic pressure chamber 62 is sealed by tubular seals 63A and 63B, respectively, at inner and outer surfaces of the chamber 62. The intermediate tubular part 40-2 of the clutch drum 40 is formed with ports 64 for a passage of the clutch operating oil, the port 64 being opened to the hydraulic pressure chamber 62. The drum support part 61 forms a passageway 66 for the operating oil, which passageway receives a clutch operating oil from a not shown oil pump and forms an annular groove 68 at an outer surface of the drum support part 61. Seal rings 69 are arranged on both side of the annular groove 68, so that a rotatably sealed structure is created for the annular groove 68, so that an introduction of the clutch operating oil into the hydraulic pressure chamber 62 as well as a discharge of the clutch operating oil from the hydraulic pressure chamber 62 are obtained by way of the operating oil port 64, the annular groove 68 and the operating oil passageway 66. Coil springs 44 are arranged between the hydraulic piston 42 and the spring plate 46. The spring plate 46 abuts a snap ring 70 fitted to the intermediate tubular part 40-2 of the clutch drum 40. As a result, the springs 44 urge the hydraulic piston 42 so that the latter contacts with the opposite surface of the clutch drum 40 as shown in FIG. 2, thereby minimizing the volume of the hydraulic chamber 62. The hydraulic piston 42 forms a clutch driver part 42-1 at an outer peripheral part faced with the clutch pack 50. FIG. 2 illustrates a low pressure condition in the hydraulic chamber 62, which causes the clutch driver part 42-1 to be spaced from the clutch pack 50, causing the forward clutch 24 to take non engaged or released condition.

Figure 5:
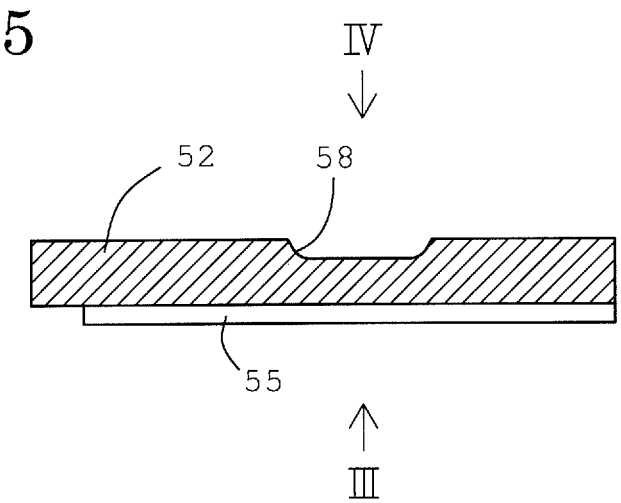
FIG. 5 is a partial enlarged cross-sectional view of an outer peripheral part of the drive plate taken along lines V-V in FIG. 3.
Figure 8:
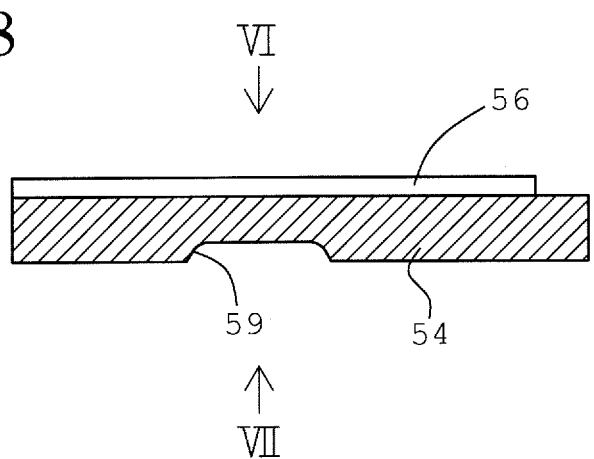
FIG. 8 is a partial enlarged cross-sectional view of an outer peripheral part of the driven plate taken along lines VIII-VIII in FIG. 6.

The drive plates 50 in the clutch pack 50 form spline parts 52-1 at respective inner peripheral portions. Refer also to FIGS. 3 to 5. The clutch hub 48 is, at its inner peripheral part, fixed to the sun gear 30 by means of a suitable means such as welding and, at its outer peripheral part, has a tubular part, which forms spline parts 48-1 each extending along the entire axial length. Thanks to engagements between the spline parts 48-1 and 52-1, the drive plates 52 rotate integrally with respect to the clutch hub 48, while the drive plates 52 being slidable axially thereto. The driven plates 54 in the clutch pack 50 form spline parts 54-1 at respective outer peripheral parts. Refer also to FIGS. 6 to 8. The clutch hub 40 forms, at an inner surface of the outer tubular part 40-3 thereof, spline parts 40-3a along the entire axial length of the part 40-3. Thanks to engagements between the spline parts 40-3a and 54-1, the driven plates 54 rotate integrally with respect to the clutch drum 40, while driven plates 54 being slidable axially thereto.

The intermediate tubular part 40-2 of the clutch drum 40 forms a port 72 for an introduction of clutch oil, which port is opened to the inside of the clutch drum 40 at a location spaced from the oil pressure chamber 62 with respect to the oil pressure piston 42, so that the port 72 is completely separated from the passageway 64 for the clutch operating oil and is connected to a not shown source for the clutch fluid such as a pump operated by the engine and/or an electrically operated pump. As a result, the clutch fluid supplied at a predetermined pressure fills the location for the planetary gear device 28 as well as the space inside the clutch drum 40 except for the piston chamber 62.

The introduction of the clutch controller oil into the piston chamber 62 causes the pressure in the chamber 62 to exceed a preset value of the springs 44, so that the piston 44 moves against the force of the spring toward the clutch pack 50. Such movement of the piston 42 causes the dive part 42-1 thereof to contact with the clutch pack 50 at the driven plate 54 adjacent the piston 42, on one hand and, on the other hand, the drive plate 52 the most spaced from the piston 42 contacts, via the clutch facing 55 attached to the single side of the latter drive plate 52, with faced surface of the carrier 36. The carrier 36 engages, at its side adjacent the planetary gear 28, with a snap ring 74 fitted to a groove in the inner surface of the outer tubular part 40-3 of the clutch drum 40. As an oil pressure in the piston chamber 62 increases, an engagement of the clutch pack 50 between the piston 42 and the carrier 36 is obtained. Namely, as the pressure increases, a slip engaged condition of the clutch pack 50 initially appears, where a week fixture of the clutch pack 50 allows the drive plates 52 to be slipped with respect to the driven plates 54 via the clutch facings 55 and 56. Further increase of the oil pressure in the piston chamber 62 finally causes to obtain a completely engaged condition of the clutch, where no slippage of the driven plates 54 with respect to the drive plates 52 is allowed.

The reverse clutch 26 is only schematically illustrated in FIG. 2 and includes, as similar to the forward clutch, a clutch pack having drive plates, driven plates and clutch facings between the drive plates and driven plates adjacent with each other and includes an oil pressure piston, which is similar to the oil pressure piston 42. In the clutch pack, the drive plates or the driven plates are under spline engagement with the outer tubular part 40-3 of the clutch drum 40, which become the drive side tubular member when the present invention is practiced in the reverse clutch 26. Contrary to this, the driven plates or the drive are under spline engagement with the opposite surface of the transmission case, which becomes driven side tubular member when the present invention is practiced in the reverse clutch 26. As a result of this structure, an engagement of the reverse clutch 26, a braking of the clutch drum 40 is obtained. A detail of the structure of the reverse clutch 26 is described in the Patent Document 4 et al and the reverse clutch 26 in this embodiment may have the same structure as in the document.

Now, an operation of the forward-reverse switching mechanism 16 will now be explained with reference to the forward-reverse switching in the 1-motor 2-clutch hybrid vehicle as shown in FIG. 1. When vehicle is forwardly moved, the reverse clutch 26 is disengaged and the forward clutch 24 is engaged. The engagement of the forward clutch 24 causes the clutch hub 48 and the clutch drum 40 to be integrated in a rotating movement. Namely, in the planetary gear device, the carrier 36 and the sun gear 30 are integrally rotated, so that the ring gear 32 also rotates under the same rotational speed. As a result, one to one rotating movement transmission occurs from the inlet side sun gear 30 connected to the drive source, i.e., the electric motor 14 and/or the engine 10 to the CVT 18 by way of the ring gear 32. Contrary this, when the vehicle is rearwardly moved, the forward clutch 24 is disengaged and the reverse clutch 26 is engaged. The engagement of the reverse clutch 26 causes the clutch drum 40 to be subjected to the braking, so that the rotating movement of the drive source, i.e., the electric motor 14 and/or the engine 10 is transmitted to the CVT 18 via the ring gear 32 under the gear number ratio between the ring gear 32 and the sun gear 30.

The 1-motor 2-clutch hybrid vehicle employed with CVT as shown in FIG. 1, when the vehicle starts, enters into HEV mode where, in addition to the power of the electric motor 14, the rotating power of the engine 10 by the engagement of the engine clutch 12 are used, as described in the Patent Document 6. In order to absorb a rotational speed difference of the driven side (the driven plates 54) with respect to the inlet side (drive plates 52) as generated by the rotating movement of the engine 10, a control of the pressure in the piston chamber 62 is done, so that a transmission of a power corresponding the depression of an acceleration pedal occurs while the driven plates 54 being slipped with respect to the drive plates 52 (WSC mode). As far as slip control of the clutch in more detail is concerned, refer the Patent Documents 5 and 6. In such a way of the power transmission, where a slippage is arisen between the drive plates 52 and the driven plates 54, a high road operation as in the case, for example, in a hill start necessitates for the clutch to be able to transmit a large amount of torque while the clutch being slipped, resulting in a large amount of generation of a friction, which may cause the clutch plates, i.e., the drive plates and the driven plates to be excessively heated. The construction of the clutch pack 50 in this embodiment of the present invention can prevent this problem from being occurred as will be fully discussed below.

Figure 9:
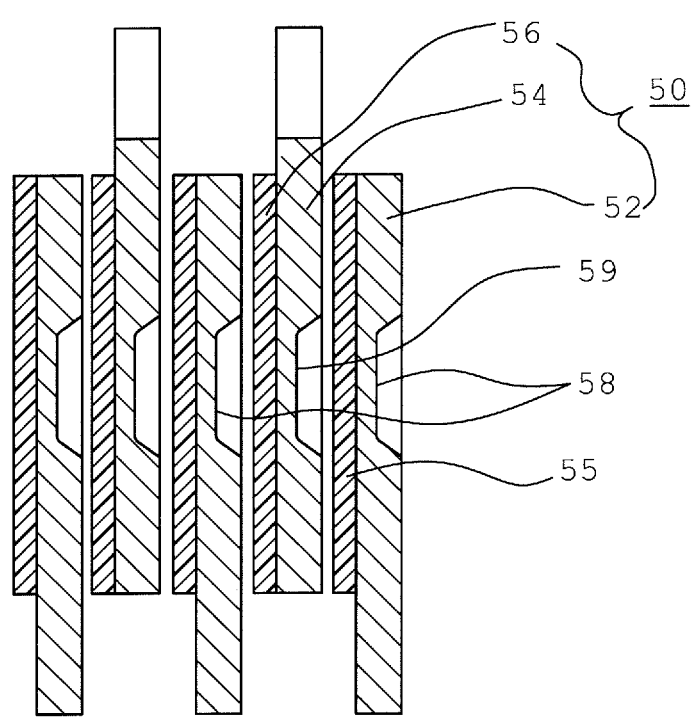
FIG. 9 is cross sectional view of a principal part of a clutch pack in the wet-type multi plate clutch in the first embodiment of the present invention.

FIG. 9 illustrates partially the clutch pack 50 in the first embodiment of the present invention and has a construction that the clutch facings 55 and 56 are fixed to the single sides of the drive plate 52 and the driven plates 54, respectively, that the annular grooves 58 and 59 are formed at the opposite sides of the drive plate 52 and the driven plates 54, respectively, that the annular grooves 58 on the drive plates 52 face the clutch facings 56 of the driven plates 54 and the annular grooves 59 on the driven plate 54 face the clutch facings 55 of the of the drive plates 52. FIG. 9 illustrates a non-connected or non-engaged condition in an exaggerated manner that gaps exist between the opposed surfaces of the clutch facings 55 of the drive plates 52 and driven plates 54 and between the opposed surfaces of the clutch facings 56 of the driven plates 54 and the drive plate 52. In the first embodiment of the present invention, the annular grooves 58 are formed on the surfaces of the drive plate 52 at the respective central parts opposite the clutch facings 56 and the annular grooves 59 are formed on the surfaces of the driven plate 54 at the respective central parts opposite the clutch facings 55. In other words, a structure is provided that the surfaces of the drive plates 52 on which the circular grooves 58 are formed as well as the surfaces of the driven plates 54 on which the circular grooves 59 are arranged between the clutch facings 55 and 56 which are axially adjacent with each other. When the clutch is completely or firmly connected or engaged (not in WSC mode), the drive plates 52 make, at the respective clutch facings 55, close contacts with the opposed driven plates 54, on one hand and, on the other hands, the driven plates 54 make, at the respective clutch facings 56, close contacts with the drive plates 52. However, a power transmission in the WSC mode occurs by the engagements of the drive plates 52 with the clutch facings 56 of the opposed driven plates 54 while, between the drive plates 52 and the clutch facings 56, oil films exist and slippages occur and by the engagements of the driven plates 54 with the clutch facings 55 of the opposed drive plates 52 while, between the driven plates 54 and the clutch facings 55, oil films exist and slippages occur. As a result, friction forces are generated in the sliding surfaces of the drive plates 52 opposed to the clutch facings 56 and in the sliding surfaces of the driven plates 54 opposed to the clutch facings 55. In the first embodiment of the present invention, the surfaces of the drive plates 52 effecting slide movement with respect to the clutch facings 56 form the annular grooves 59 at the respective center portions and the surfaces of the driven plates 54 effecting slide movement with respect to the clutch facings 55 form the annular grooves 59 at the respective center parts. In other words, during the WSC mode, not only the sliding surfaces of the drive plates 52 on which the annular grooves 58 are formed but also the sliding surfaces of the driven plates 54 on which the annular grooves 59 are formed are interposed between the clutch facings 55 and 56 are axially adjacent with each other. The materials such as glass fibers for constructing the clutch facings 55 and 56 have increased degree of thermal insulating property, so that the above interposed structure can prevent the friction heat from being conducted axially. In other words, the clutch facings 55 and 56 create discontinuation zones of the friction heat in axial direction. Furthermore, any contacts of the annular grooves 58 and 59 on the respective sliding surfaces with respect to the clutch facings 55 and 56 do not occur and clutch oil held by or filled in the annular grooves 58 and 59 serve to cool the sliding surfaces, which prevent the heat from being concentrated at the central parts of the sliding surfaces. The annular grooves 58 and 59 filled by the clutch oil construct discontinuation zones of the friction heat in the radial directions and, therefore, a conduction or dissipation of the heat as generated by the sliding movement likely occur to the inner and outer sides of the annular grooves 58 and 59. In short, the friction heat as generated in the drive plates 52 and the driven plates 54 under a power transmission while the clutch being slipped as occurred in WSC mode is easily dissipated to the inner and outer parts of the annular grooves 58 and 59. As a result, a concentration of the heat as generated by the sliding movement to the central parts is prevented and a more evened distribution of the temperature of the drive plates 52 and the driven plates 54 is obtained.

Figure 10A:
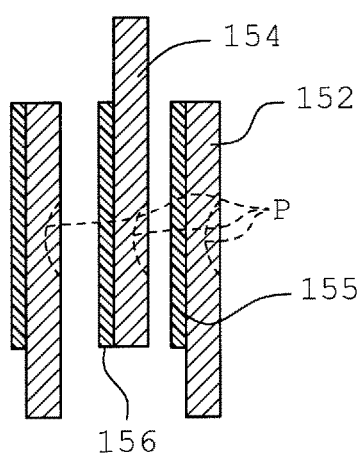
FIG. 10A shows, partially and schematically, a wet-type multi plate clutch of a single attached arrangement in the prior arts for an illustration of temperature distributions on slide surfaces.
Figure 10B:
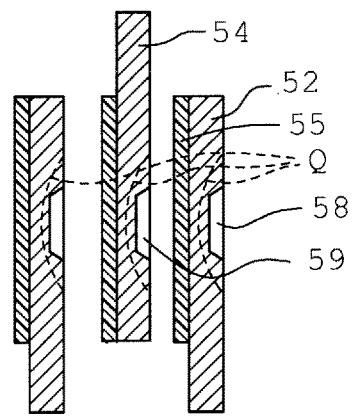
FIG. 10B shows, partially and schematically, a wet-type multi plate clutch of a single attached arrangement in the first embodiment of the present invention for an illustration of temperature distributions on slide surfaces.
Figure 10C:
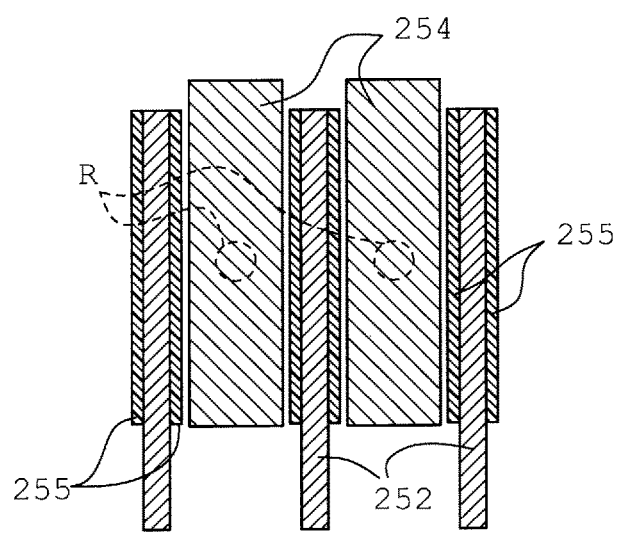
FIG. 10C shows, partially and schematically, a wet-type multi plate clutch of a wet-type multi plate clutch of a double attached arrangement in the prior art with no oil groove on clutch sliding surfaces.
Figure 10D:
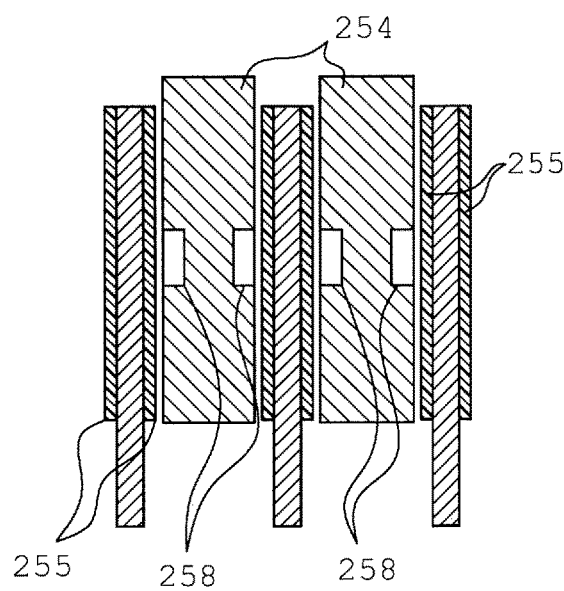
FIG. 10D shows, partially and schematically, a wet-type multi plate clutch of a wet-type multi plate clutch of a double attached arrangement in the prior art with oil grooves on on clutch sliding surfaces.
Figure 11:
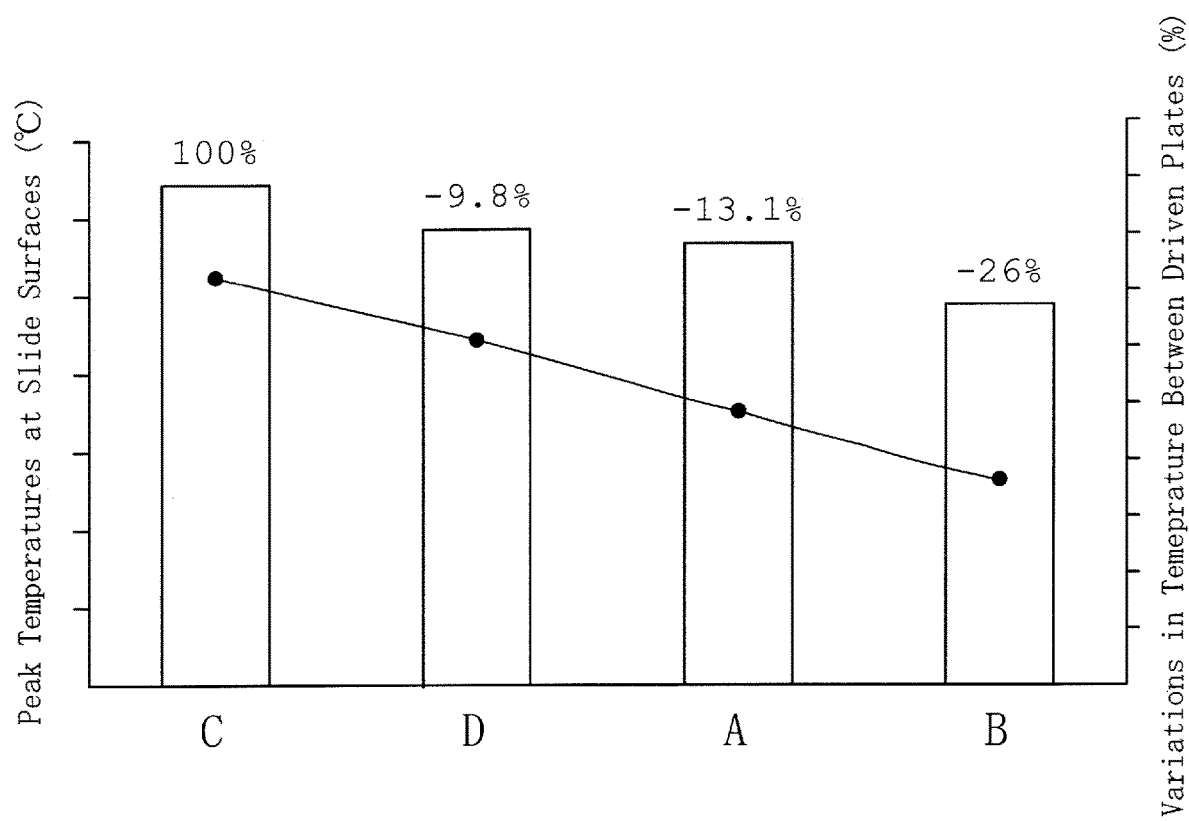
FIG. 11 is bar charts and graphs illustrating values of peak temperature of sliding surface and temperature variations between drive plates of the wet-type multi-plate clutch, respectively, in the first embodiment of the present invention in comparison with those of the prior arts.

FIGS. 10A, 10B, 10C and 10D schematically illustrate temperature control characteristics during the slip control in WSC mode in the wet-type multi-plate clutch of the single side attached arrangement in the first embodiment of the present invention in FIGS. 1 to 9 in comparison with the prior art wet-type multi-plate clutches. Although the clutch plates are, actually, engaged with each other via oil films therebetween while being slided with each other, FIGS. 10A to 10D depict the clutch plates in the conditions that are spaced with each other for the sake of clarity of explanation of operations only. FIG. 10A illustrates schematically the single side attached arrangement in the prior art as that shown in the Patent Document 2, in which clutch facings 155 and 156 are located between drive plates 152 and driven plates 154, which are faced and located adjacent with each other. During engagements of the clutch plates while being slipped, the faces of the drive plates 152 and the driven plates 154 facing and contacting with the clutch facings 156 and 155 (the sliding parts) is heat insulated (or can function as a discontinuation zone in heat conduction) in the axial direction due to heat insulation capability of the materials constructing the clutch facings 155 and 156. Any discontinuation zone however does not exist in the radial direction, which could result the friction heat to be heavily concentrated to the central parts of the clutch plates opposing the clutch facings 155 and 156. In FIG. 10A, dotted lines P illustrates schematically and graphically an isothermal line in a heat distribution. Contrary to this, in the present invention as shown in FIG. 10B, the sliding surfaces of the drive plates 52 and driven plate 54 are interposed between the clutch facings 55 and 56 at respective their opposed sides, so that an axial discontinuation structure in the heat conduction is provided as similar to the prior art in FIG. 10A. In addition, in the present invention, the annular grooves 58 and 59 are provided at the center positions opposite the clutch facings 58 and 59 for the storages of the clutch oil, which serve to depress a conduction of heat radially toward central parts of the clutch plates, i.e., to create discontinued zones in heat conduction in radial directions. As a result, a concentration of the heat toward the central parts is depressed, on one hand and, on the other hand, a conduction of friction heat in radial outward direction is more likely. As a result, a reduced degree of temperature gradient, i.e., a more flattened isothermal line Q is obtained as schematically and graphically illustrated in FIG. 10B. As a result of the reduced degree of temperature gradient in the present invention, a reduction in thermal deformation is obtained not only in the drive plates but also in the driven plates. FIG. 10C shows schematically a conventional double side attached arrangement in the Patent Document 1, where clutch facings 255 are connected to opposed sides of drive plates 252. In the double side attached arrangement, the driven plates 254 receive the entire amount of friction heat as generated, so that the driven plates 254 have an increased value of axial thickness when compared with that of the single side attached arrangement. The driven plates 254 when engaged with the clutch facings 255 receive, at respective opposed sides, the sliding heat, so that the heat is directed to the central parts not only in the axial direction but also in the radial direction. In other words, the heat is likely concentrated at the central parts and spot like portions R of highly increased temperature are created. FIG. 10D as in the Patent Document 3 shows an improvement of the conventional double attached arrangement in FIG. 10C, in which annular grooves 258 are formed on the surfaces (sliding parts) facing the clutch facings 255. However, this improvement does not provide any means for providing axial discontinuity in the heat conduction, so that a concentration of the heat to the central parts still occurred and is not enough to become a measure for the temperature gradient problem. FIG. 11 is for an illustration of friction temperature characteristics of the present invention (B) in FIG. 10B and those of the prior arts (A), (C) and (D) as explained with reference to FIGS. 10A, 10C and 10D, respectively. In FIG. 11, the ordinate on the left-hand side shows peak temperatures of the sliding surfaces as indicated by bar chart and the ordinate on the right-hand side shows variations of temperature of the driven plates as indicated by line graph. In FIG. 11, the numeric values accompanied with the respective bar sections of the peak temperature indicate values of ratio of decreases of the peak temperature in percent with reference to the reference value of peak temperature in case of the double-side attachment arrangement in the prior art as illustrated in FIG. 10C expressed as 100%. FIG. 11 clarifies that the construction of the present invention can attain a decrease of the peak temperature as high as 26% decrease of the peak temperature. Furthermore, the line graph illustrating the temperature variation of the driven plates in FIG. 11 shows that the construction of the first embodiment of the present invention as shown in FIG. 10B can provide more equalized temperature distribution as shown by (B) over the structures in the prior arts as shown by (A), (C) and (D), respectively. Concerning tests for obtaining the result shown in FIG. 11, test pieces of the clutch packs of the constructions shown by (A), (B), (C) and (D) in FIGS. 10A, 10B, 10C and 10D, respectively including for driven plates were prepared, on each of which driven plates of each of the test pieces, thermoelectric couples were attached three different locations. The drive plates and the driven plates of the clutch packs were engaged under the same conditions and temperature measurements were done. Finally, in each of the test pieces (clutch packs) corresponding to the constructions of FIGS. 10A, 10B, 10C and 10D, as peak temperature, the maximum value of the measured temperature was employed and as the temperature variation, a difference between the maximum and minimum values was employed.

Figure 12A:
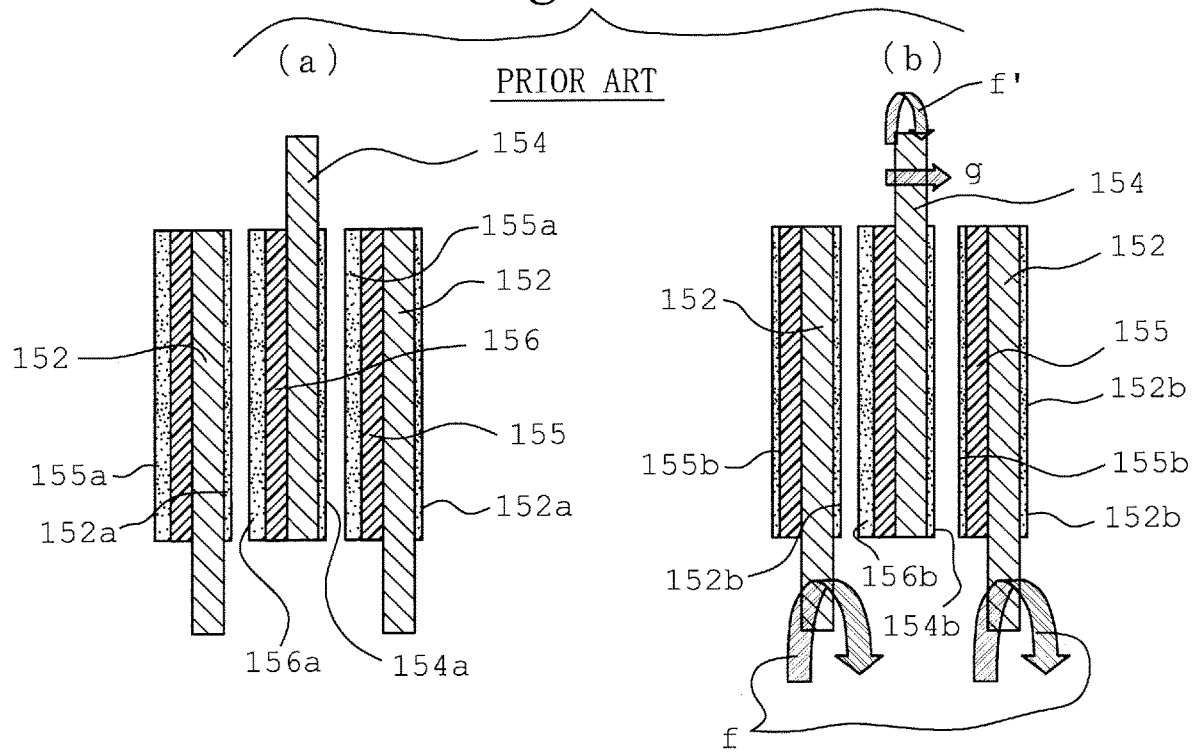
FIG. 12A shows a disengaged condition of the wet-type multi plate clutch of the single side attached arrangement in the prior art and illustrates different modes of operation of the same clutch in the prior art in sections (a) and (b), respectively.
Figure 12B:
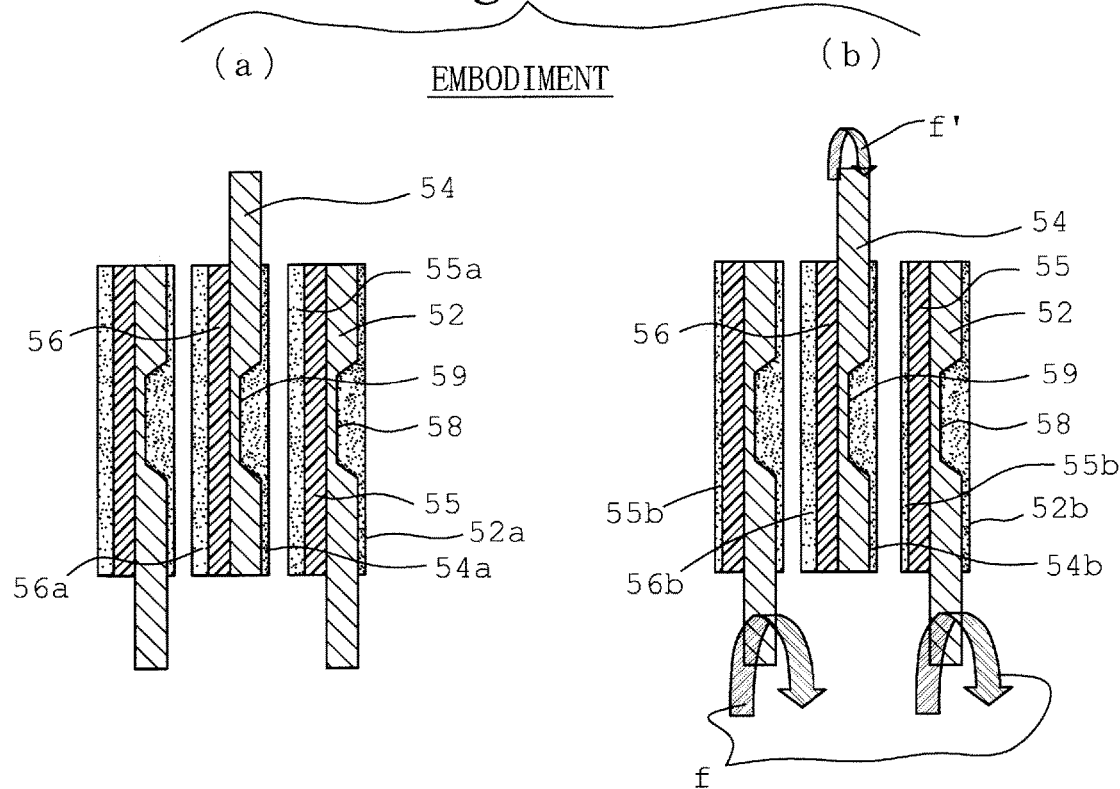
FIG. 12B shows a disengaged condition of the wet-type multi plate clutch of the single side attached arrangement in the first embodiment of the present invention and illustrates different modes of operation of the clutch in the first embodiment of the present invention in sections (a) and (b), respectively.

The single side attached arrangement in first embodiment of the present invention in FIG. 10B has an advantageous effect in low friction during a non-connected condition over that at the prior art single side attached arrangement in FIG. 10A. Namely, FIGS. 12A and 12B illustrate schematically how the clutch oil attaches or adheres to the clutch facings when the clutches are non-engaged in comparison between the prior art and the present invention. FIG. 12A shows the prior art clutch of the single side attached arrangement. In FIG. 12A, a section (a) shows in a mode of operation when vehicle is stopped with no rotating movement of the engine. In this case, the clutch oil films 155a and 156a on the clutch facings 155 and 156, respectively have values of thickness larger than the values of thickness of the clutch oil films 152a and 154a on the sliding surfaces of the drive plates 152 and driven plates 154, respectively due to the increased oil attaching ability on the clutch facings 155 and 156. Between the drive plates 152 and driven plates 154, any difference of the film thickness does not however exist. In FIG. 12A, a section (b) shows a mode of operation when the vehicle is moved, i.e., the engine is rotated with the clutch still not being engaged. In this case, the thickness of oil films (oil amount) on the clutch facings 155 of the drive plates 152 rotating at high speed as shown by the arrows f become fairly thinner as illustrated by 155b. The high rotating speed as shown by arrows f may causes the mount of oil (film thickness) attached to the drive plates 152 to be slightly reduced as shown by 152b in comparison with 152a but the difference is not so significant. As to the driven plates 154 and the clutch facings 156 rotating at very low rotational speed as shown by arrows f', the thickness of oil film layer 154b and 156b are substantially unchanged in comparison with those of oil film layers 154a and 156a. A change of large amount of attached oil in the oil films 155a on the clutch facings 155 of the drive plates 152 during the non-rotated condition to the small amount of attached oil in the oil films 155b during the high speed rotating condition causes the flow speed of the clutch oil to significantly increase, which causes the driven plates 154 to be axially deflected as shown by an arrow g, resulting in an increase in clutch friction irrespective of the non-engaged condition of the clutch.

FIG. 12B shows how the oil attachment occurs in the single side attached arrangement in the embodiment of the present invention. FIG. 12B shows, in a section (a), a mode when vehicle is stopped with no rotating movement of the engine. In this case, thickness of the oil films 55a and 56a on the clutch facings 55 and 56, respectively are thicker than the thickness of the oil films 52a and 54a on the sliding surfaces of the drive plates 52 and the driven plates 54b, respectively due to the increased oil attached ability of the clutch facings 55 and 56, respectively. Furthermore, values of the oil film thickness are unchanged between the dive plates 52 and the driven plates 54 as similar to the single side attached arrangement in the prior art as illustrated in FIG. 12A, the section (a). FIG. 12B shows, in section (b), a mode when the vehicle is moved, i.e., the engine is rotated while the clutch being not engaged. In this case, the thickness of oil films (oil amount) on the clutch facings 55 of the drive plates 52 rotating at high speed as shown by the arrow f becomes fairly thinner as illustrated by 55b. The high rotating speed as shown by arrows f may causes the attached amount of oil (film thickness) attached to the drive plates 52 to be slightly reduced as shown by 52b but the difference is not so significant. As to the driven plates 54 and the clutch facings 56 rotating at very low rotational speed as shown by arrows f', the thickness of oil film layer 54b and 156b are substantially unchanged in comparison with those of oil film layers 54a and 56b. This relationship is also substantially unchanged with reference to the prior art in FIG. 12A, section (b) in the conventional single side attached arrangement. However, the provision of the annular grooves 59 on the sliding surfaces of the driven plates 54 whereat oil deposit is obtained results in a corresponding increase in oil amount, which compensates the decrease in the thickness in the oil films 55b and results in an equalization of the oil amounts between the faced surfaces, thereby preventing speed of clutch oil flow from being substantially increased. As a result, an axial deflection of the driven plates 154 as could occur in the prior art as shown by the arrow g (FIG. 12A, section (b)) does not occur or does not substantially occur. This makes the single side attached arrangement of the present invention to be significant in an advantage as obtained that the friction during the non-engaged condition of the clutch does not substantially increases.

Figure 13:
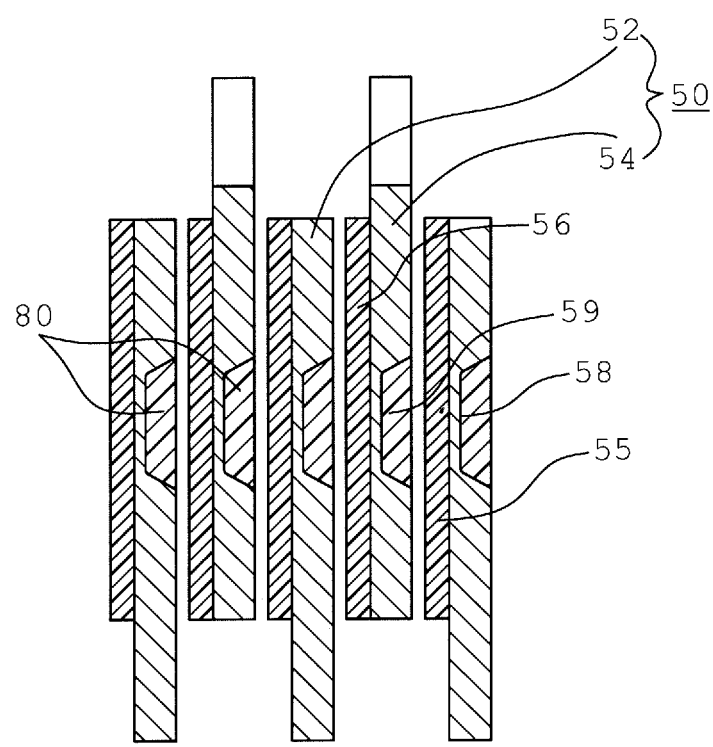
FIG. 13 shows a principal part of a wet-type multi plate clutch in a second embodiment of the present invention.

FIG. 13 illustrates a clutch pack 50 in a second embodiment of a wet-type multi plate clutch of the present invention of the same construction as the first embodiment in that the clutch pack has the axially alternate arrangement of the drive plate 52 and the driven plates, the clutch facings 55 and 56 are arranged on single sides of the drive plates 55 and the driven plates 56, respectively and the annular grooves 58 and 59 are arranged on the opposite sides of the drive plates 55 and the driven plates 56, respectively. The second embodiment differs from the first embodiment in that materials 80 for holding the clutch oil are filled in the annular grooves 58 and 59, respectively. The oil holder materials 80 are as similar to the clutch facings formed from materials of increased degree of affinity to clutch oil, such as glass fibers and some resin materials. The affinity to the clutch oil of the materials allows an increased amount of the oil to be positively held in the grooves 58 and 59, resulting in an increased cooling effect by the clutch oil. In addition, an increased heat insulation function in the axial direction is obtained, which results in a more increased degree of heat insulating function by the provision of the discontinuous zones in sliding parts as well as in a heat transmission or conduction according to the present invention.

Figure 14:
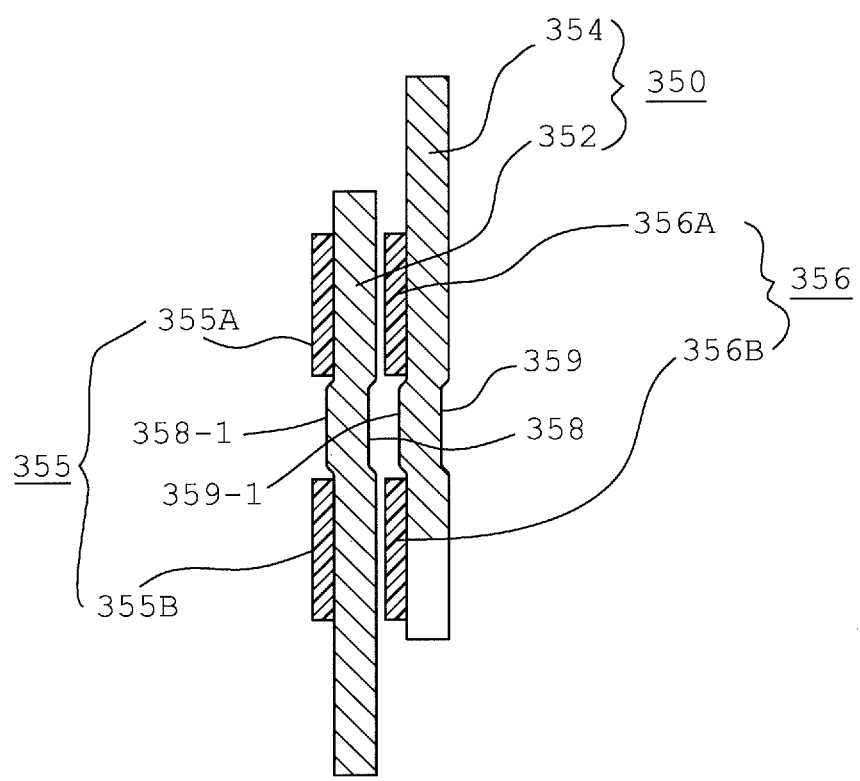
FIG. 14 shows a principal part of a wet-type multi plate clutch in a third embodiment of the present invention.

FIG. 14 illustrates schematically a clutch pack 350 in a third embodiment of a wet-type multi plate clutch according to the present invention. In this embodiment, a drive plate 352 and a driven plate 354 constructing the clutch pack 350 are subjected to a press working to steel plates to form annular grooves 358 and 359. As a result, the drive plate 352 and the driven plate 354 forms, along the entire peripheral lengths, annular projected parts 358-1 and 359-1 having axes of rotation coaxial with the axis of the rotation, which projected parts are located opposite the annular projected parts 358-1 and 359-1, respectively. In order to avoid mutual contact between the drive plate 352 and the driven plate 354, clutch facings 355 and 356 on the drive plate 352 and the driven plate 354 are constructed by outer peripherally divided parts 355A and 356A and inner peripherally divided parts 355B and 356B, respectively. In other words, the clutch facings 355 and 356 have radially divided structures, respectively. In this embodiment, the single side attached arrangement of the clutch facings 355 and 356 on the drive plate 352 and the driven plate 354, respectively are combined with the press work structure of the annular grooves 358 and 359 on the drive plate 352 and the driven plate 354, respectively makes it possible to keep a heat resistance ability as a same level as that in the first embodiment (FIG. 9) while reducing a manufacturing cost by employing the pressed structure. Namely, in case of the pressed structure, a use of press molds may be possible, by which an execution of a press forming process of the drive plate 352 and the driven plate 354 allows the annular grooves 358 and 359 to be simultaneously formed, which results in a reduction in the number of stages of the press forming, which leads to a reduction in the production cost.

Figure 15A:
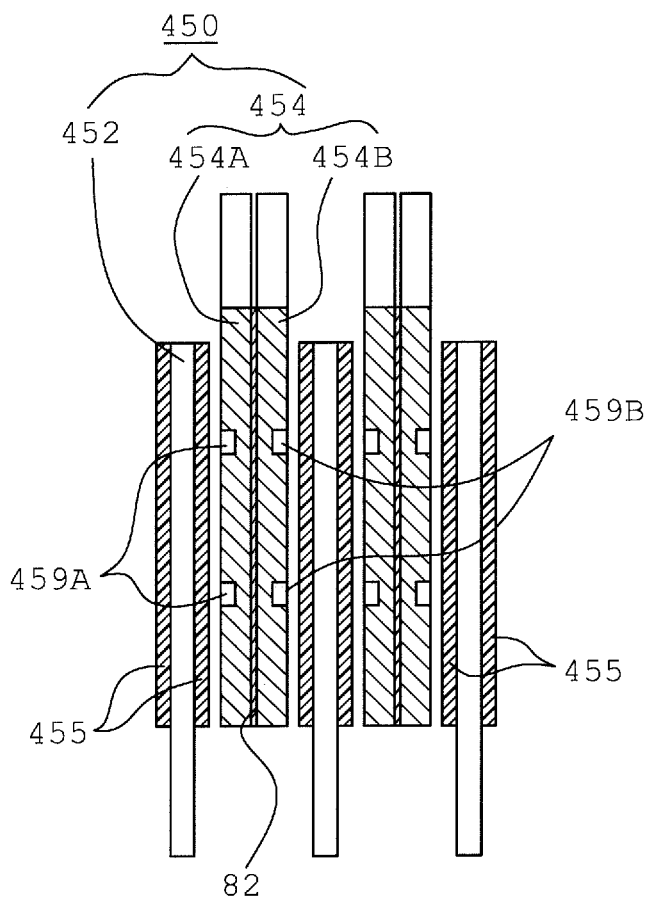
FIG. 15A shows a principal part of a wet-type multi plate clutch in a fourth embodiment of the present invention.
Figure 15B:
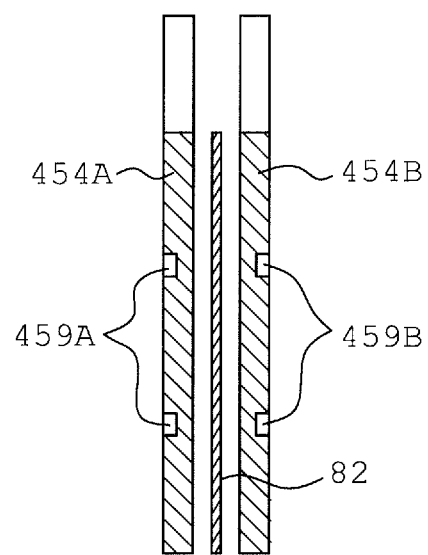
FIG. 15B illustrates a process for assembling a driven plate of the clutch in FIG. 15A.

FIG. 15A shows schematically a clutch pack in a forth embodiment of a wet-type multi plate clutch according to the present invention. This embodiment is a realization of the idea of the present invention applied to the double attached arrangement described in the Patent Document 1 (JPP 2013-249871). In this embodiment, a clutch pack 450 is provided with driven plates 452 having on both sides clutch facings 455 as similar to the construction and with driven plates 454 having no clutch facings, as similar to the constructions shown in FIGS. 100 and 10D. Each of the driven plates 454 is of a combined structure from the plate members 454A and 454B. To obtain the combined structure, a thin plate 82 made of a heat insulating material is interposed between the plate members 454A and 454B of each of the driven plates 454. In order to obtain the driven plate 454, the thin plate 82 made of the heat insulating material is first arranged between the pair of between the plate members 454A and 454B as shown in FIG. 15B and a bonding under a pressure or an adhesion under the heat is done in order to obtain an integrated structure. In the clutch pack 450 of the double attached arrangement in the fourth embodiment of the present invention, a structure for preventing axial transmission of a friction heat is obtained because each of the sliding surfaces of the driven plates 450 is provided thereon with the annular groves 459A and 459B, respectively and because the annular groves 459A and 459B are axially located between the clutch facings 455 and the layers of the heat insulating materials (the thin plates 82). Furthermore, thanks to the annular groves 459A and 459B on the sliding surfaces with respect to the clutch facings 455 as well as the clutch oil held in the grooves, disconnected zones in heat conduction in a heat transmission are created for preventing the friction heat from being concentrated and stayed at the central parts, which allows the heat generated at the sliding surfaces to be easily transmitted to the entire parts of the driven plates 454, resulting in a reduction in the temperature gradient. In short, a realization of the idea of the present invention is obtained even in the wet-type multi-plate clutch of the double attached arrangement.

BRIEF EXPLANATION OF REFERENCE NUMERALS

10: Internal Combustion Engine
12: Engine Clutch
14: Electric Motor for Moving Vehicle
16: forward-reverse switching mechanism
18: CVT
20: Differential
22: Driving Wheel
24: Clutch for Forward Movement
26: Clutch for Reverse Movement
27: Transmission Case
28: Planetary Gear Mechanism
40: Clutch Drum (Driven Side Tubular Member of the Invention)
42: Hydraulic Pressure Piston
46: Clutch Hub (Drive Side Tubular Member of the Invention)
50, 350, 450: Clutch Pack
52, 352, 452: Drive Plate (Drive Side clutch Plate of the Invention)
54, 354, 454 (454A, 454B): Driven Plate (Driven Side clutch Plate of the Invention)
55, 355, 455: Clutch Facing on Drive Plate
56, 356: Clutch Facing on Driven Plate
58, 358: Annular Groove on Drive Plate
59, 359, 459 (459A, 459B): Annular Groove on Driven Plate

The invention claimed is:

1. A wet multi plate clutch comprising:
a drive side tubular member;
a plurality of drive side clutch plates fixed in rotation and axially slidable with respect to the drive side tubular member;
a driven side tubular member;
driven side clutch plates fixed in rotation with respect to the driven side tubular member and axially slidable with respect to the driven side tubular member in an axially alternate manner with respect to the drive side clutch plates, and
clutch facings comprising heat insulating material and fixedly arranged on one of axially opposite surfaces between the drive side clutch plates and the driven side clutch plates, the drive side and driven side clutch plates being located axially adjacent with each other,
wherein the drive side clutch plates and the driven side clutch plates are structured such that an axially relative movement of the drive side clutch plates and the driven side clutch plates under an outwardly applied force causes said opposite surfaces of the drive side clutch plates and the driven side clutch plates to obtain a clutch engaged condition due to mutual engagements between said opposite surfaces of the drive side clutch plates and the driven side clutch plates by the clutch facings, irrespective of whether slippage is generated,
wherein the wet multi plate clutch further comprises annular grooves on respective surfaces of the clutch plates at parts thereof facing respective surfaces of the clutch plates on which the clutch facings are arranged, the annular grooves being extended along substantially entire circumferential lengths of the clutch plates, wherein each of the clutch plates the drive side clutch plates and the driven side clutch plates includes, on axially opposite surfaces of each of the clutch plates, one of the clutch facings only on one surface thereof and one of the annular grooves only on an opposite surface thereof, and wherein, during the engaged condition of the clutch, said parts of the clutch plates, on which the annular grooves are provided, are sandwiched between the clutch facings on the drive side clutch plates and the clutch facings on the driven side clutch plates, which drive and driven plates are located axially adjacent which each other.

2. The wet multi plate clutch according to claim 1, wherein each of the annular grooves in each of the drive side and driven side clutch plates is a pressed part, and includes, at opposite sides, a projected part disposed so as to radially divide respective ones of the clutch facings.

3. The wet multi plate clutch according to claim 1, wherein, in a vehicle configured to cause vehicle wheels of the vehicle to rotate at least partially by using rotational power of an output shaft of an internal combustion engine, the clutch is configured to transmit rotational power of the internal combustion engine to sides of the wheels, and the clutch plates are configured such that the rotational power of the internal combustion engine is transmitted to wheel sides while slippage occurs between the clutch plates and the clutch facings when the transmission of the rotational power is started.

4. The wet multi plate clutch according to claim 3, wherein the vehicle is a hybrid vehicle in which both of an electric motor and an internal combustion engine are used for rotating sources for wheels of the vehicle, the wet multi plate clutch is configured to transmit driving power of the electric motor or of the engine and the electric motor to the wheel sides, the electric motor, or the engine and the electric motor, being configured to transmit the driving power while slippage occurs between the clutch plates and the clutch facings when the vehicle starts.

5. A drive train for vehicle wheels comprising an internal combustion engine having an output shaft configured to carry out rotating movement, at least partially, for rotating the wheels, and a wet multi plate clutch interposed in the drive train for selective transmission of the rotating movement to the wheels, said wet multi plate clutch comprising:

a drive side tubular member;

a plurality of drive side clutch plates fixed in rotation and axially slidable with respect to the drive side tubular member;

a driven side tubular member;

driven side clutch plates fixed in rotation with respect to the driven side tubular member and axially slidable with respect to the driven side tubular member in an axially alternate manner with respect to the drive side clutch plates, and clutch facings comprising insulating material and fixedly arranged on one of axially opposite surfaces between the drive side clutch plates and the driven side clutch plates, the drive side and driven side clutch plates being located axially adjacent with each other, wherein the drive side clutch plates and the driven side clutch plates are structured such that an axially relative movement of the drive side clutch plates and the driven side clutch plates under an outwardly applied force causes said opposite surfaces of the drive side clutch plates and the driven side clutch plates to obtain a clutch engaged condition due to mutual engagements between said opposite surfaces of the drive side clutch plates and the driven side clutch plates by the clutch facings, irrespective of whether slippage is generated, the wet multi plate clutch further comprising annular grooves on respective surfaces of the clutch plates facing respective surfaces of the clutch plates on which the clutch facings are provided, said annular grooves being extended along substantially entire circumferential lengths of the clutch plates, wherein each of the clutch plates of the drive side clutch plates and the driven side clutch plates includes one of the clutch facings only on one side surface thereof and one of the annular grooves only on an opposite side surface thereof, wherein during the engaged condition of the clutch, parts of the clutch plates are sandwiched between the clutch facings on the drive side clutch plates and the clutch facings on the driven side clutch plates, which drive and driven plates are located axially adjacent with each other, and wherein the drive side clutch plates and the driven side clutch plates are configured such that slippage during the engaged condition of the clutch occurs when initiating the transmission of the rotating movement of the engine to the vehicle wheels.

6. A wet multi plate clutch comprising:

a drive side tubular member;

a plurality of drive side clutch plates rotatably fixed and axially slidable with respect to the drive side tubular member;

a driven side tubular member; and a plurality of driven side clutch plates, axially adjacent to the drive side clutch plates respectively, the driven side clutch plates rotatably fixed with respect to the driven side tubular member and axially slidable with respect to the driven side tubular member in an axially alternate manner with respect to the drive side clutch plates;

wherein each of the drive side clutch plates and the driven side clutch plates has (a) a clutch facing including heat insulating material and arranged on one surface of the clutch plate, and (b) a groove on an opposite surface of the clutch plate and extending along substantially an entire circumferential length of the clutch plate;

wherein the clutch facings are configured to engage respective opposing surfaces of the drive side clutch plates and the driven side clutch plates with each other due to axially relative movement of the drive side clutch plates and driven side clutch plates under an outwardly applied force, irrespective of whether slippage is generated; and wherein, during an engaged condition of the clutch, the parts of the clutch plates having the annular grooves are sandwiched between the clutch facings of drive side clutch plates and the clutch facings of the driven side clutch plates that are adjacent to each other.

* * * * *